(12) United States Patent
Yu et al.

(10) Patent No.: US 9,915,983 B2
(45) Date of Patent: Mar. 13, 2018

(54) DRIVE CARRIER COUPLING SYSTEM

(71) Applicant: Dell Products L.P., Round Rock, TX (US)

(72) Inventors: Chien Tung Yu, New Taipei, TN (US); Yen Ming Wu, Taipei (TW); Ju Hao Lee, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/981,251

(22) Filed: Dec. 28, 2015

(65) Prior Publication Data

US 2017/0185111 A1  Jun. 29, 2017

(51) Int. Cl.
*G06F 1/18* (2006.01)
*G06F 1/16* (2006.01)

(52) U.S. Cl.
CPC ............ *G06F 1/187* (2013.01); *G06F 1/1658* (2013.01); *G06F 1/1656* (2013.01)

(58) Field of Classification Search
CPC ........ G06F 1/181–1/187; G06F 1/1658; G06F 1/1656; G11B 33/124; G11B 33/125; G11B 33/128
USPC .............. 361/679.31–679.39, 724–727, 798; 220/752, 761, 762
See application file for complete search history.

(56) References Cited

U.S. PATENT DOCUMENTS

| | | | | |
|---|---|---|---|---|
| 5,767,445 A * | 6/1998 | Wu | ...................... | G11B 33/124 174/542 |
| 5,797,667 A * | 8/1998 | Wu | ...................... | H05K 7/1411 312/223.2 |
| 6,418,762 B1 * | 7/2002 | Munch | ................... | E05B 13/002 312/216 |
| 6,798,650 B2 * | 9/2004 | Reznikov | .............. | G11B 33/122 312/223.1 |
| 7,639,492 B2 * | 12/2009 | Thomas | ................... | G06F 1/187 361/679.33 |
| 7,701,707 B2 * | 4/2010 | Peng | ..................... | G11B 33/124 248/618 |
| 7,921,439 B2 * | 4/2011 | Christie, Jr. | ......... | G11B 17/041 312/223.1 |
| 8,248,775 B2 * | 8/2012 | Zhang | ..................... | G06F 1/187 248/27.1 |
| 9,253,914 B2 * | 2/2016 | Demange | .............. | H05K 7/1487 |
| 9,392,719 B1 * | 7/2016 | Chen | .................... | G11B 33/124 |

(Continued)

*Primary Examiner* — Steven T Sawyer
*Assistant Examiner* — Sagar Shrestha
(74) *Attorney, Agent, or Firm* — Haynes and Boone, LLP

(57) ABSTRACT

A component carrier coupling system includes a carrier base including a carrier wall. A handle is coupled to the carrier wall by a plurality of link elements that each include a first end rotatably connected to the handle and a second end rotatably connected to the carrier wall. The handle is maintained in a substantially parallel orientation to the carrier wall when the plurality of link elements are rotated in a first direction that moves the handle away from the carrier wall, and in a second direction that is opposite the first direction and that moves the handle immediately adjacent the carrier wall. A cam element is provided on at least one of the plurality of link elements and engages a component enclosure when the carrier base is located in the component enclosure and the plurality of link elements are rotated in the second direction.

17 Claims, 13 Drawing Sheets

(56) References Cited

U.S. PATENT DOCUMENTS

| | | | | |
|---|---|---|---|---|
| 2002/0101713 A1* | 8/2002 | Eland | ............... | G06F 1/184 |
| | | | | 361/679.42 |
| 2003/0155471 A1* | 8/2003 | Dean | ............... | G06F 1/184 |
| | | | | 248/27.1 |
| 2004/0017650 A1* | 1/2004 | Liu | ............... | G06F 1/187 |
| | | | | 361/679.33 |
| 2005/0051672 A1* | 3/2005 | Dean | ............... | G06F 1/184 |
| | | | | 248/27.1 |
| 2007/0149018 A1* | 6/2007 | Gunther | ............ | H05K 7/1409 |
| | | | | 439/160 |
| 2008/0013272 A1* | 1/2008 | Bailey | ............... | G06F 1/187 |
| | | | | 361/679.33 |
| 2010/0172086 A1* | 7/2010 | Chen | ............... | G11B 33/128 |
| | | | | 361/679.33 |
| 2010/0183365 A1* | 7/2010 | Deinhardt | ............ | H05K 7/1409 |
| | | | | 403/322.4 |
| 2011/0095153 A1* | 4/2011 | Zhang | ............... | G06F 1/187 |
| | | | | 248/309.1 |
| 2011/0273850 A1* | 11/2011 | Chen | ............... | H05K 5/0221 |
| | | | | 361/726 |
| 2016/0042768 A1* | 2/2016 | Yang | ............... | G11B 33/128 |
| | | | | 403/322.4 |
| 2016/0302322 A1* | 10/2016 | Chen | ............... | F16B 2/18 |

\* cited by examiner

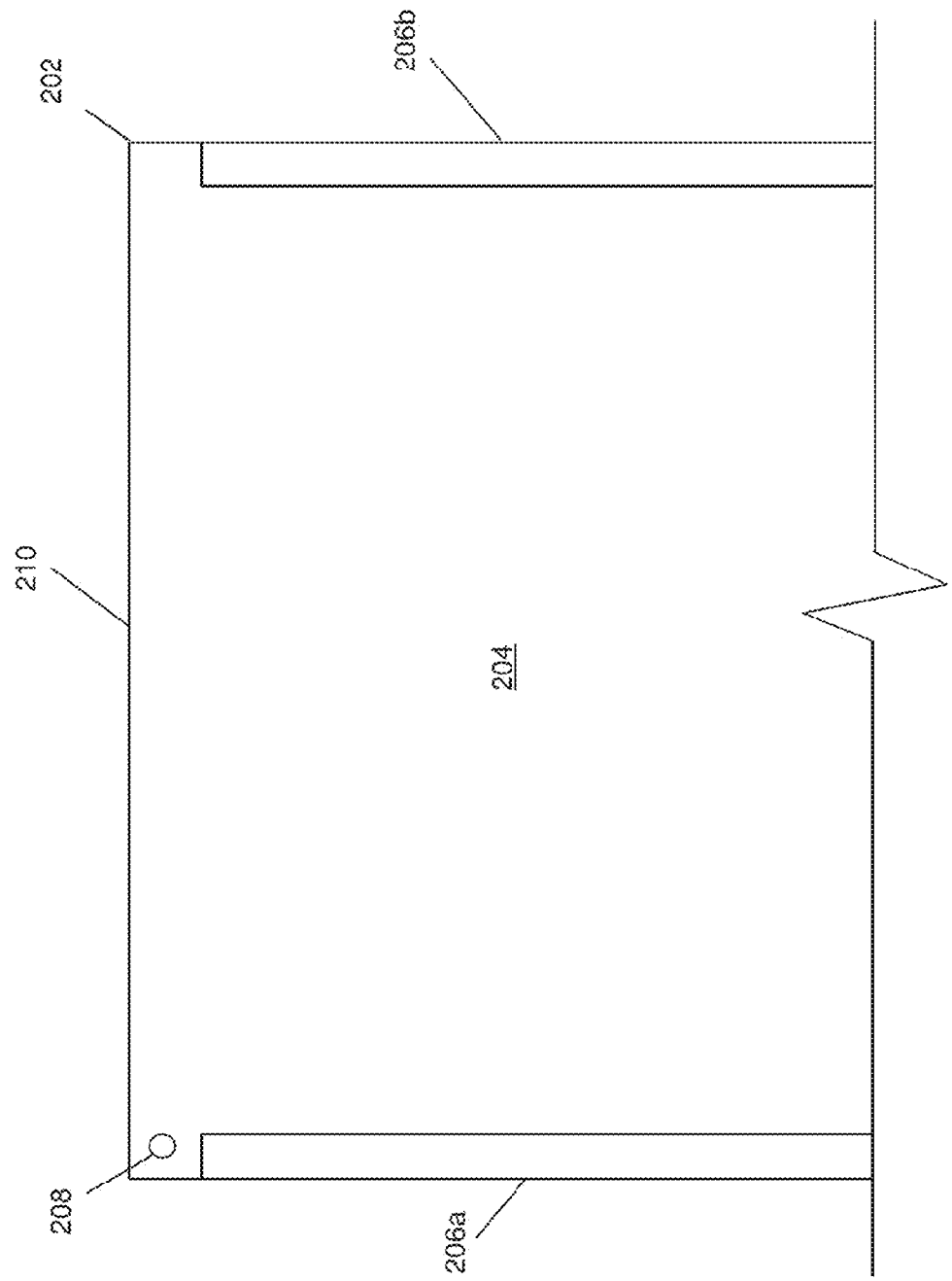

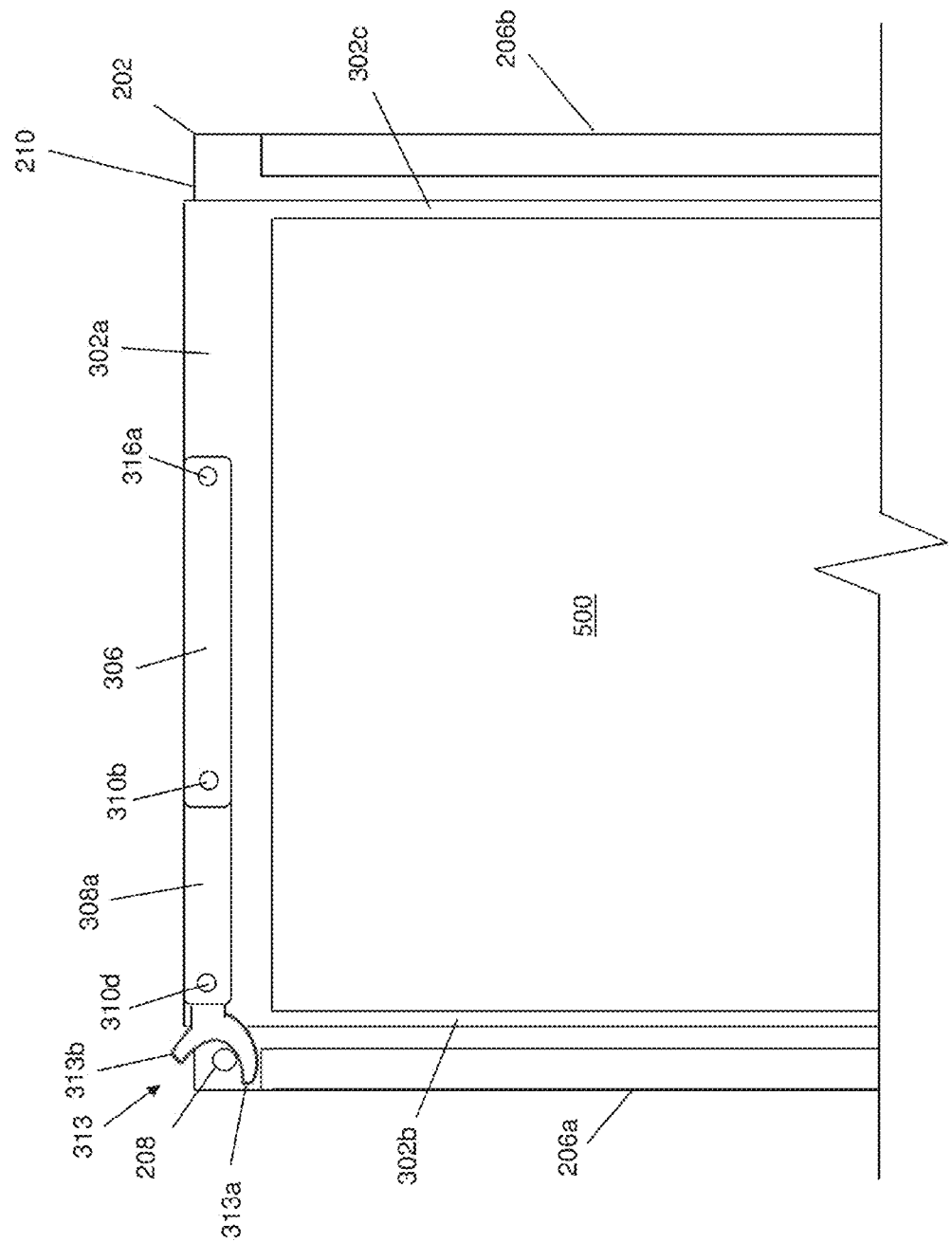

DRIVE CARRIER COUPLING SYSTEM

BACKGROUND

The present disclosure relates generally to information handling systems, and more particularly to a drive carrier for coupling drives to an information handing system As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, storage systems, sometimes include drive enclosures that are configured to house a plurality of storage drives such as, for example, hard disk drives, solid state drives, and/or other storage drives known in the art. For example, some servers such as 4U servers available from Dell, Inc. of Round Rock, Tex., United States, may include up to 90 hard disk drives as a storage system for the server, and such dense systems limit the space available for drive coupling features in order to allow airflow to pass through the system. Typically, those drives are coupled to respective drive carriers that include a coupling mechanism that is configured to engage the drive enclosure to couple the drive to the drive enclosure. Conventional drive carriers for such dense systems typically include a single handle that has a cam mechanism and that is rotatable connected to the drive carrier via a single hinge on a side of the drive carrier. When coupling a drive to the drive enclosure, the drive and drive carrier combination is inserted into a drive slot defined by the drive enclosure while the handle on the drive carrier is oriented at approximately a 45 degree angle relative to a front surface of the drive such that the cam mechanism does not extend from a side of the drive carrier, which allows the drive and drive carrier combination to be inserted into a drive slot. When the drive and drive carrier combination is seated in the drive slot, the handle on the drive carrier is then rotated about the single hinge such that the engagement of the cam mechanism and the drive enclosure results in a securing cam action that secures the drive and drive carrier combination in the drive enclosure (e.g., typically with the handle at a 0 degree angle relative to the front surface of the drive). Securing of the drive and drive carrier combination in the drive enclosure may include the handle on the drive carrier engaging a handle latch on the drive carrier that prevents rotation of the handle.

When removing the drive and drive carrier combination from the drive enclosure, a user will typically release the handle latch to allow rotation of the handle on the drive carrier. The handle on the drive carrier is then rotated about the single hinge such that the engagement of the cam mechanism and the drive enclosure changes from the securing cam action to a release cam action that causes the drive and drive carrier combination to move partially out of the drive slot, which is intended to enable the user to grasp the portion of the drive and drive carrier combination to remove it from the drive slot. However, it has been found that users tend to grasp the handle to remove the drive and drive carrier combination from the drive slot, which can damage the handle and the single hinge. Furthermore, it has been found that users tend to over-rotate the handle (e.g., greater than 45 degrees) when removing the drive and drive carrier combination from the drive slot, which can also damage the handle and the single hinge, while also causing the side of the drive chassis to engage the drive enclosure and making it harder to remove the drive and drive chassis combination from the drive slot due to friction between the two.

Accordingly, it would be desirable to provide an improved drive chassis coupling system

SUMMARY

According to one embodiment, an Information Handling System (IHS) includes a drive enclosure defining a drive slot; a drive; and a drive carrier mounted to the component and positioned in the drive slot, wherein the drive carrier includes: a drive carrier wall; a handle; a plurality of link elements that each include a first end rotatably connected to the handle and a second end rotatably connected to the drive carrier wall such the handle is coupled to the drive carrier wall in a substantially parallel orientation to the drive carrier wall, wherein the plurality of link elements are spaced apart from each other such that rotation of each of the plurality of link elements in a first direction moves the handle away from the drive carrier wall, and rotation of each of the plurality of link elements in a second direction that is opposite the first direction moves the handle immediately adjacent the drive carrier wall; and a cam element on at least one of the plurality of link elements that is configured to engage the drive enclosure when the plurality of link elements are rotated in the second direction

BRIEF DESCRIPTION OF THE DRAWINGS

FIG. 2B is a side/cross sectional view illustrating an embodiment of a component slot in the component enclosure of FIG. 2A.

FIG. 9 is a side/cross sectional view illustrating an embodiment of the component and component carrier combination of FIG. 5 secured in the component slot of FIG. 2B in the component enclosure of FIG. 2A.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
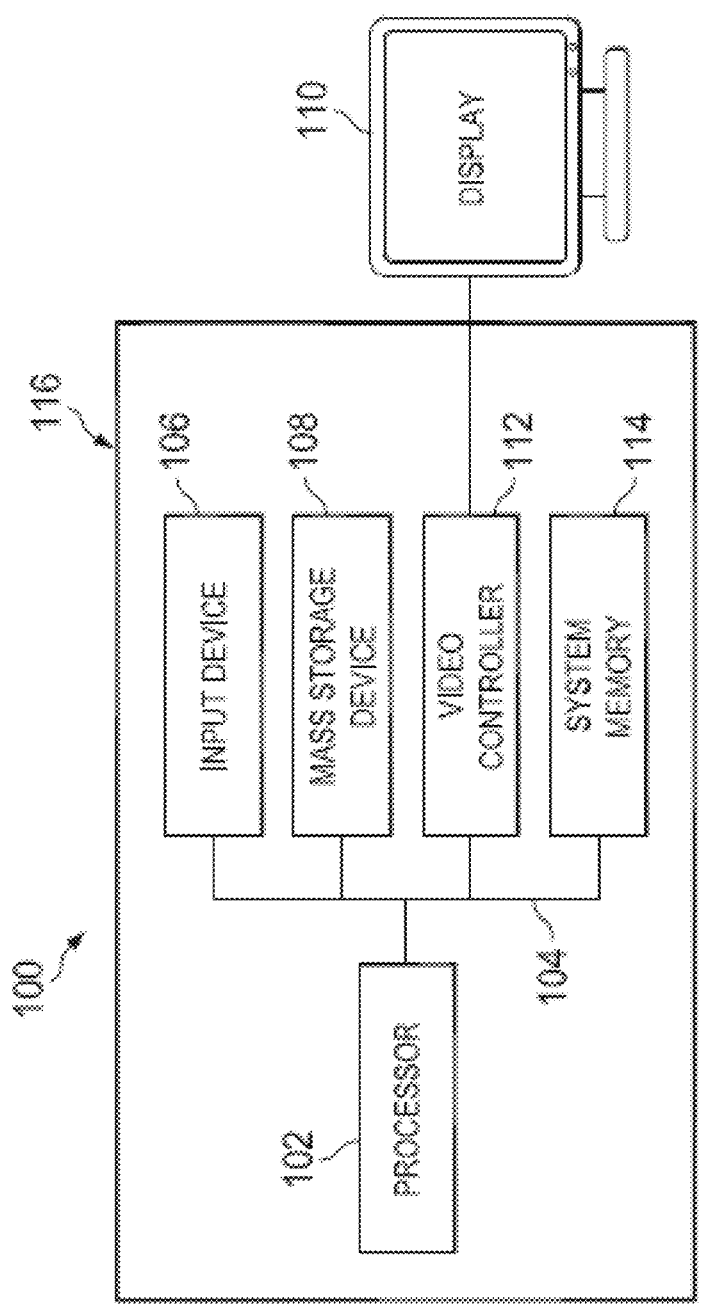
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
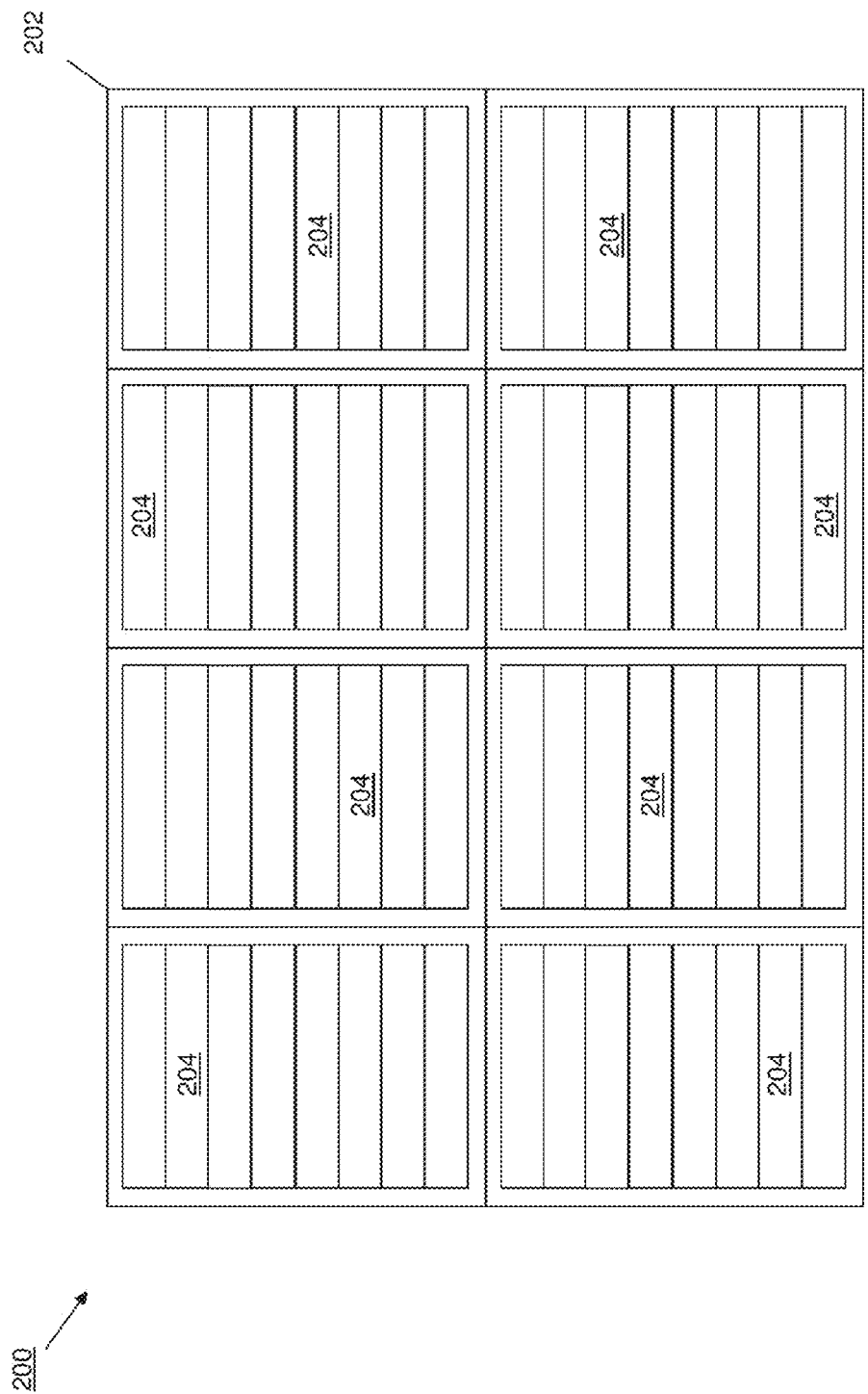
FIG. 2A is a front schematic view illustrating an embodiment of a component enclosure.

Referring now to FIGS. 2A and 2B, an embodiment of a component enclosure 200 is illustrated. In an embodiment, component enclosure 200 is provided as part of the IHS 100 discussed above with reference to FIG. 1. In the specific embodiments discussed below, the component enclosure 200 is a drive enclosure that is configured to house a plurality of storage drive components that may provide the storage device 108 discussed above with reference to FIG. 1. For example, the component enclosure 200 may be provided as part of a server that includes a plurality of hard disk drives that are housed in the component enclosure 200. However, the housing of other types of components are envisioned as falling within the scope of the present disclosure as well. The component enclosure 200 includes a base 202 that defines a plurality of component slots 204 that, in the embodiments discussed below, are configured to house storage drive devices, but that in other embodiments may be configured to house any of a variety of IHS components known in the art. FIG. 2B illustrates an embodiment of a portion of the base 202 that defines one of the component slots 204 and that includes a plurality of side walls 206a and 206b that help define the component slot 204 between them, along with a cam element 208 that is located adjacent the side wall 206a at the entrance 210 to the component slot 204. While not illustrated, one of skill in the art in possession of the present disclosure will recognize that the base 202, the side walls 206a and 206b, and/or other portions of the component enclosure 200 may include a variety of features for guiding, coupling, and/or securing component carriers in the component slots 204, as discussed in further detail below. Thus, while a specific component enclosure with specific component slots have been illustrated and described, a variety of component enclosures known in the art will benefit from the teachings of the present disclosure, and the application of those teachings to such component enclosure is envisioned as falling within the scope of the present disclosure.

Figure 3A:
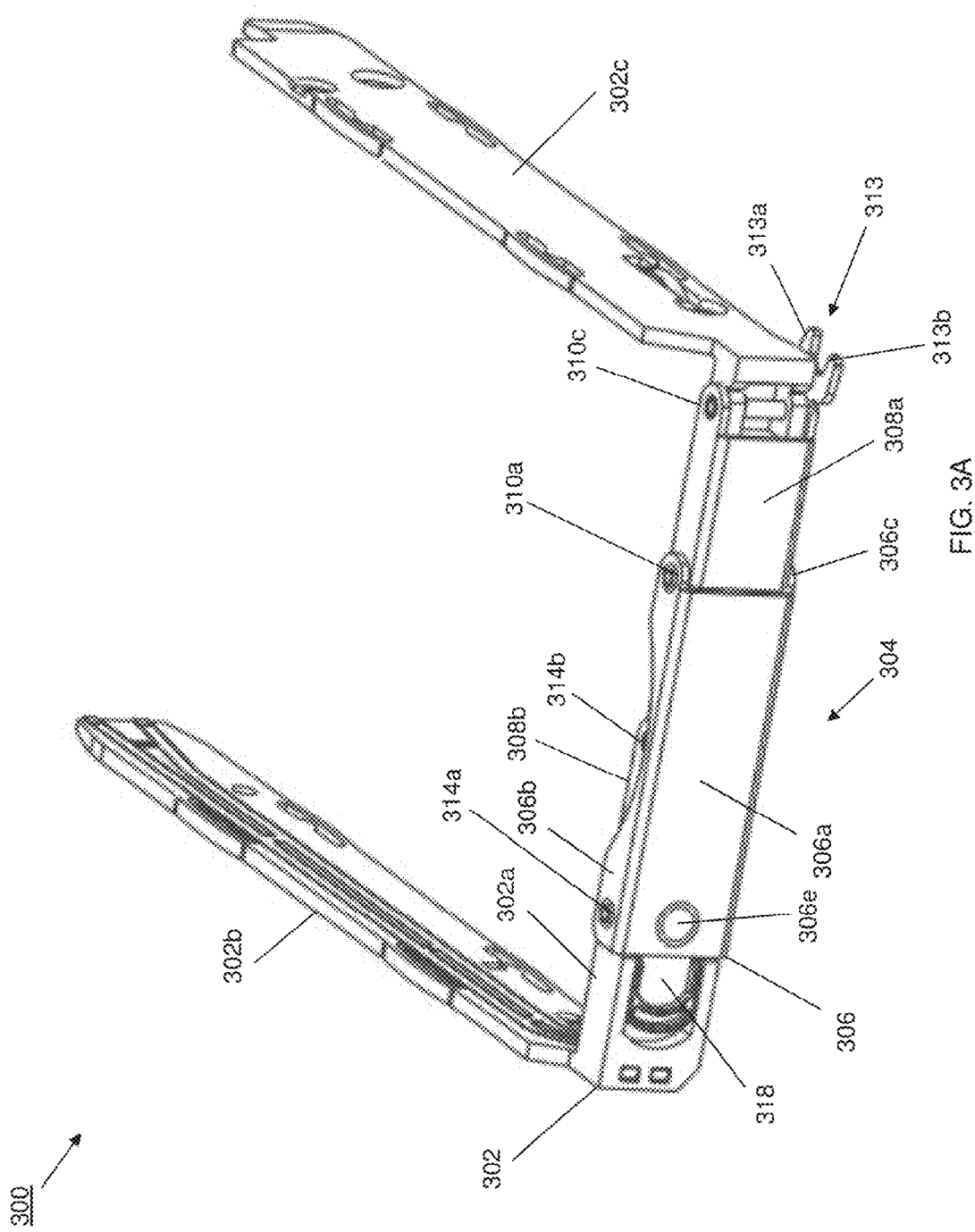
FIG. 3A is a perspective view illustrating an embodiment of a component carrier.
Figure 3B:
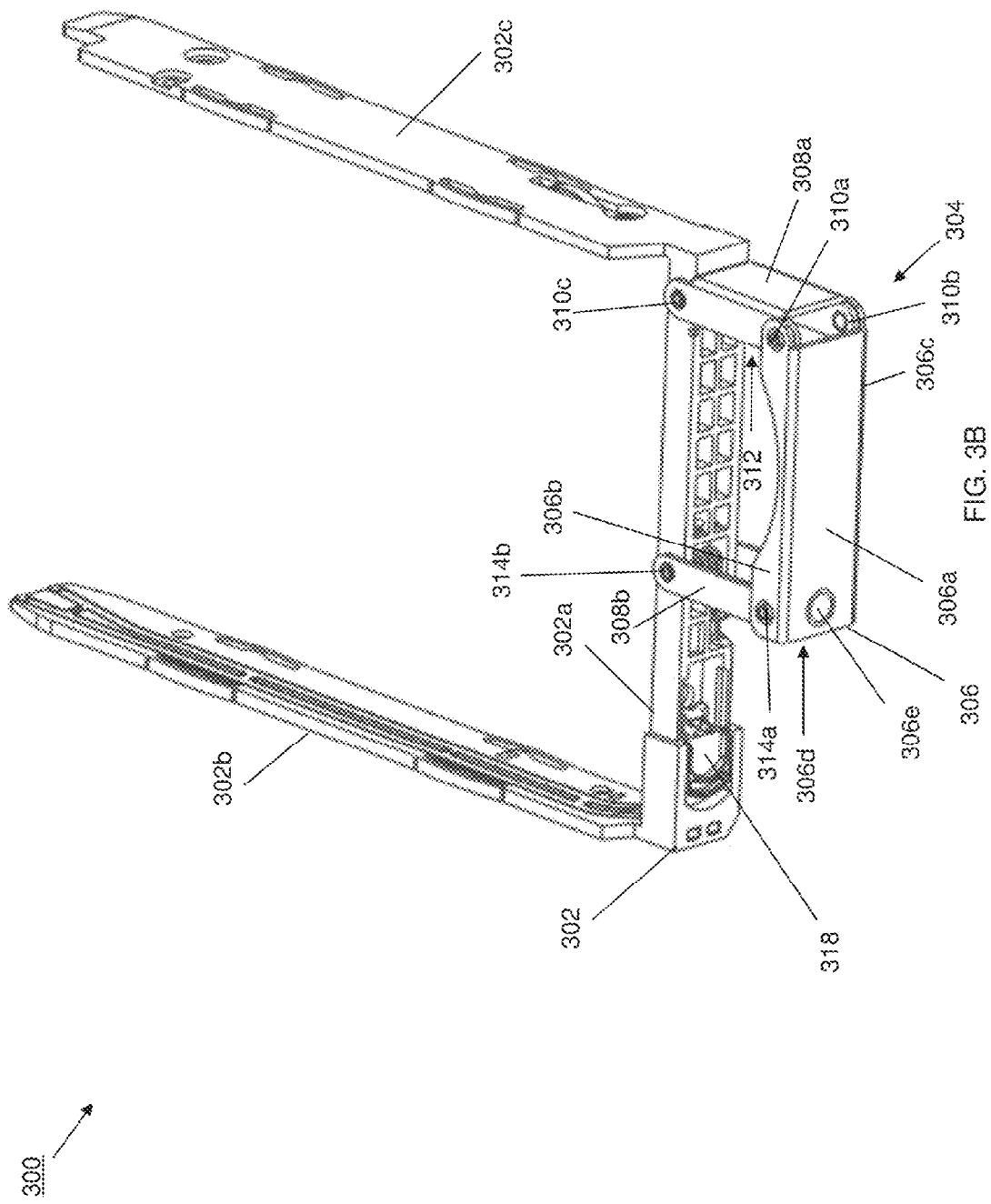
FIG. 3B is a perspective view illustrating an embodiment of the component carrier of FIG. 3A.
Figure 3C:
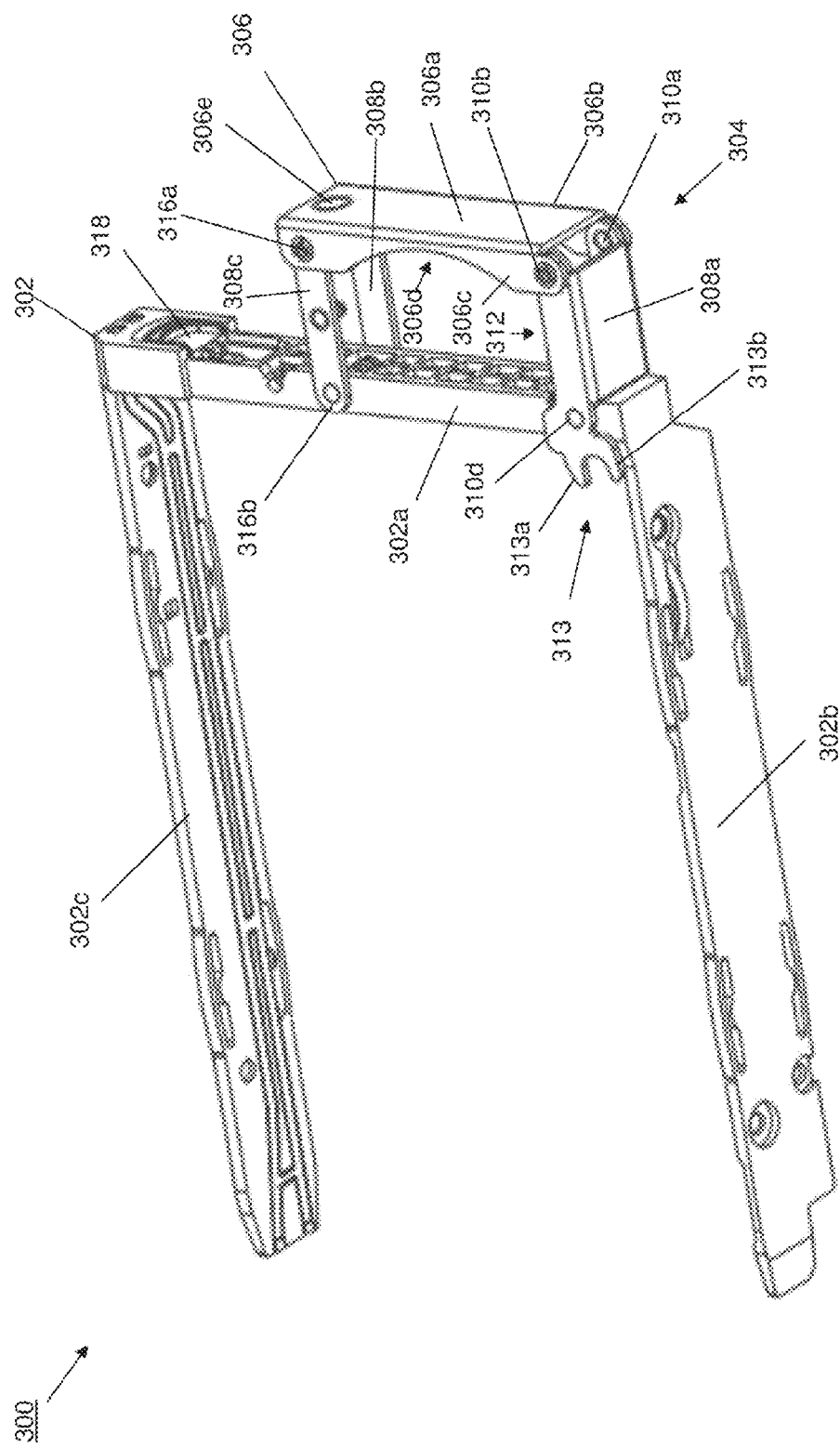
FIG. 3C is a perspective view illustrating an embodiment of the component carrier of FIG. 3A.

Referring now to FIGS. 3A, 3B, and 3C, an embodiment of a component carrier 300 is illustrated. In the embodiments discussed below, the component carrier 300 is a storage drive component carrier that is configured to mount to storage drive devices that may provide the storage device 108 discussed above with reference to FIG. 1. However, the component carrier 300 may be configured to couple to a variety of other IHS components known in the art while remaining within the scope of the present disclosure. The component carrier 300 includes a carrier base 302 having a carrier front wall 302a and a plurality of a carrier side walls 302b and 302c that extend from opposite edges of the carrier front wall 302a in a substantially parallel orientation. As illustrated in FIGS. 3A, 3B, and 3C, each of the carrier side walls 302b and 302c includes component mounting features (e.g., apertures, latches, and/or other couplers or coupling elements) that are configured to provide for the mounting of a component to the carrier base 302, as well as component enclosure guide features that are configured to engage the component enclosure 200 (e.g., portions of the base 202 on the component enclosure 200 adjacent a component slot 204) to guide the component carrier 300 into the component slot 204, as discussed in further detail below.

A carrier handling and securing feature 304 is coupled to the carrier front wall 302a. The carrier handling and securing feature 304 includes a handle 306 that, in the illustrated embodiment, is provided by a rectangular element with a substantially flat base wall 306a and a plurality of side walls 306b and 306c that define a handle channel 306d between them. In the illustrated embodiment, the handle 306 may include a latch securing feature 306e that extends into the channel 306d (which is not visible in FIGS. 3A, 3B, and 3C, but represented by the element number 306e and portion of the latch securing feature visible on the base wall 306a). A plurality of link elements 308 moveably couple the handle 306 to the carrier front wall 302a. In the illustrated embodiment, a first link element 308a includes a pair of rotatable couplings 310a and 310b to the side wall 306b and the side wall 306c, respectively, of the handle 306 adjacent a first edge of the handle 306, and a pair of rotatable couplings 310c and 310d on opposite edges of the carrier front wall 302a and adjacent the carrier side wall 302c. In the illustrated embodiment, the first link element 308a defines a link element channel 312 along its length. In the illustrated embodiment, a cam element 313 extends from the first link element 308a adjacent the rotatable coupling 310d and includes a securing portion 313a and a release portion 313b, discussed in further detail below.

In the illustrated embodiment, a second link element 308b includes a rotatable coupling 314a to the side wall 306a of the handle 306 adjacent a second edge of the handle 306, and a rotatable coupling 314b to a location on a first edge of the carrier front wall 302a that is located approximately midway between the carrier side walls 302b and 302c. In the illustrated embodiment, a third link element 308c includes a rotatable coupling 316a to the side wall 306b of the handle 306 adjacent the second edge of the handle 306, and a rotatable coupling 316b to a location on a second edge of the carrier front wall 302a that is located approximately midway between the carrier side walls 302b and 302c. A latch 318 is provided on the carrier front wall 302a adjacent the side wall 302c, and may include any of a variety of latching features that are configured to engage with the latch securing feature 306e on the handle 306 in order to prevent the handle 306 from being moved relative to the carrier front wall 302a, as well as release the handle 306 to allow it to move relative to the carrier front wall 302a, as discussed below.

FIGS. 3B and 3C illustrates the carrier handling and securing feature 304 in a non-securing, handling orientation in which the link elements 308 have been rotated about their rotatable couplings 310a-d, 314a-b, and 316a-b such that they are substantially perpendicular to the carrier front wall 302a to move the handle 306 away from the carrier front wall 302a while holding the base wall 306a of the handle 306 substantially parallel to the carrier front wall 302a, as illustrated. As can be seen, in the non-securing, handling orientation, the cam element 313 does not extend past the side wall 302b. FIG. 3A illustrates the carrier handling and securing feature 304 in a securing orientation in which the link elements 308 have been rotated about their rotatable couplings 310a-d, 314a-b, and 316a-b such that they are substantially parallel to the carrier front wall 302a to move the handle 306 towards the carrier front wall 302a while holding the base wall 306a of the handle 306 substantially parallel to the carrier front wall 30a, as illustrated. As can be seen, in the securing orientation, a portion of the carrier wall 302a becomes located in the link element channel 312 defined by the link element 308a, a portion of the carrier front wall 302a and at least a portion of each of the link elements 308a, 308b, and 308c become located in the handle channel 306d defined by the handle 306, and the cam element 313 extends past the side wall 302b. While a specific embodiment of a carrier handling and securing feature 304 is illustrated and described below, a variety of modifications to the carrier handling and securing feature 304 in accordance with the teachings of the present disclosure are envisioned as falling within the scope of the present disclosure while still providing the functionality described below.

Figure 4A:
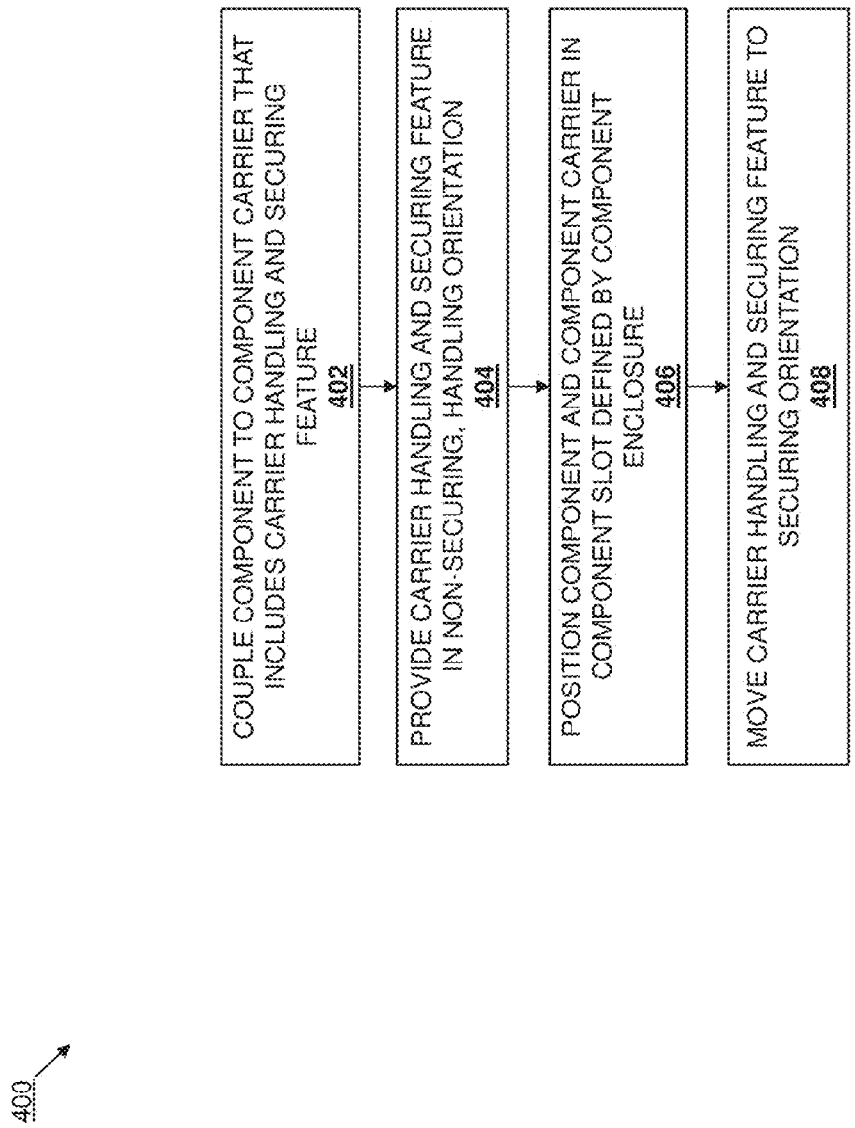
FIG. 4A is a flow chart illustrating an embodiment of a method for coupling a component carrier to a component enclosure.
Figure 4B:
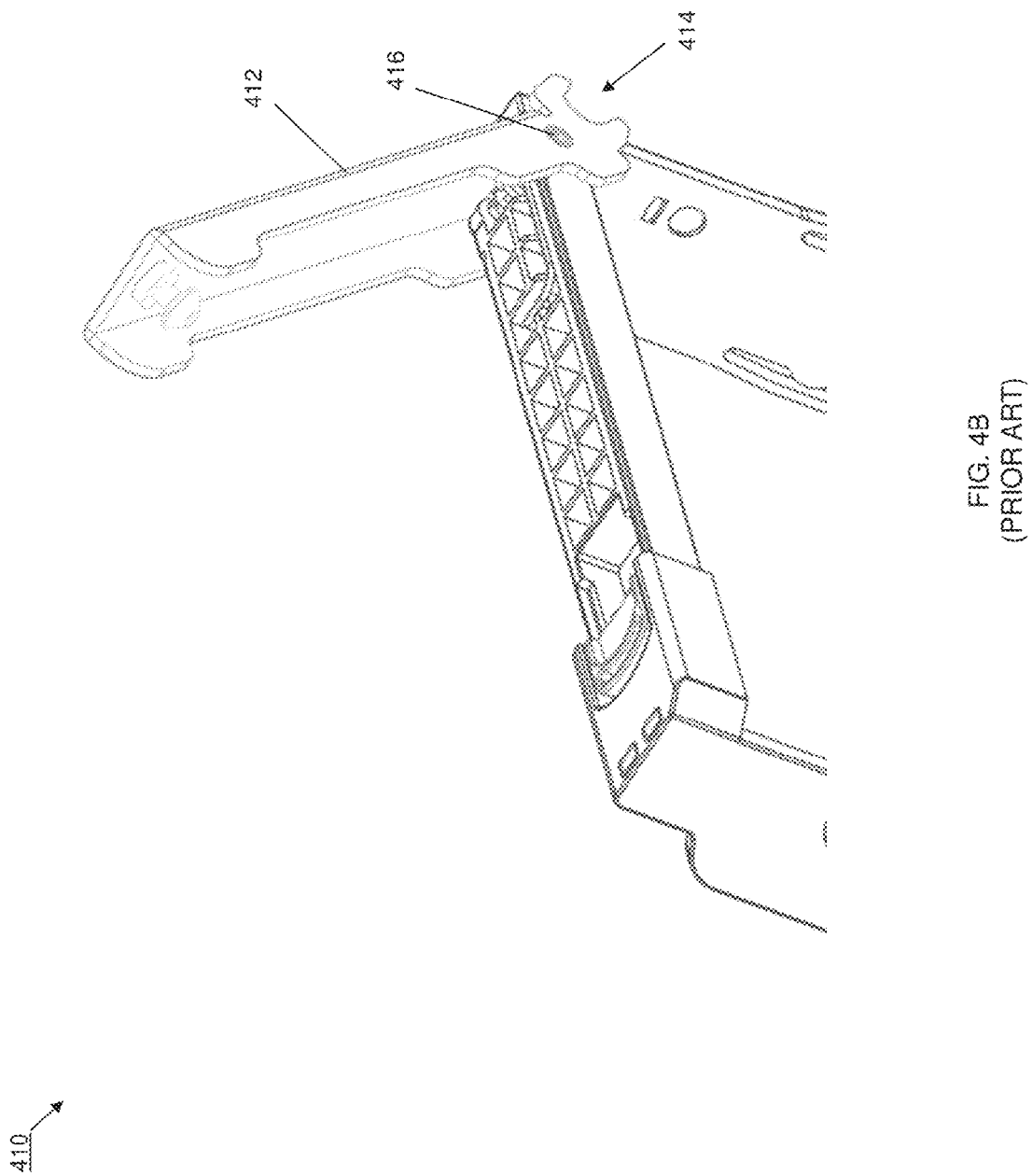
FIG. 4b is a perspective view illustrating an embodiment of a conventional drive carrier.

Referring now to FIG. 4A, an embodiment of a method 400 for coupling a component to a component enclosure is illustrated. As discussed below, the systems and methods of the present disclosure provide a component carrier having a carrier handling and securing feature that reduces stresses during the handling and securing of the component carrier to a component enclosure by distributing forces generated during the securing of the component carrier to the component carrier, while providing a handling orientation that does not focus forces on a single hinge and that does introduce frictional forces between the component carrier and the component enclosure that make it more difficult to remove the component carrier from the component enclosure. For example, FIG. 4B illustrates a prior art drive carrier 410 including a handle 412 having a cam feature 414 and coupled to the drive carrier 410 by a single hinge element 416, and discussed above, high stresses are focused on that single hinge 416 during handling of the drive carrier 410 and securing of the drive carrier 410 to the carrier enclosure that can damage the single hinge 416, and frictional forces are introduced between the drive carrier 410 and the component enclosure during decoupling of the drive carrier 410 from the component enclosure that make it more difficult to remove the drive carrier 410 from the component enclosure. In the illustrated embodiments, these problems are solved by providing a plurality of link elements that movably couple a handle to the component carrier, at least one of which includes a cam element. The plurality of link element includes a plurality of rotatable couplings that distribute forces generated during the use of the handle in handling and/or securing the component carrier to the component enclosure across a carrier front, while also activating and deactivating a cam mechanism including the cam element in a manner that does not introduce the frictional forces that are introduced in the conventional systems discussed above that make it more difficult to remove the component carrier from the component enclosure.

Figure 5:
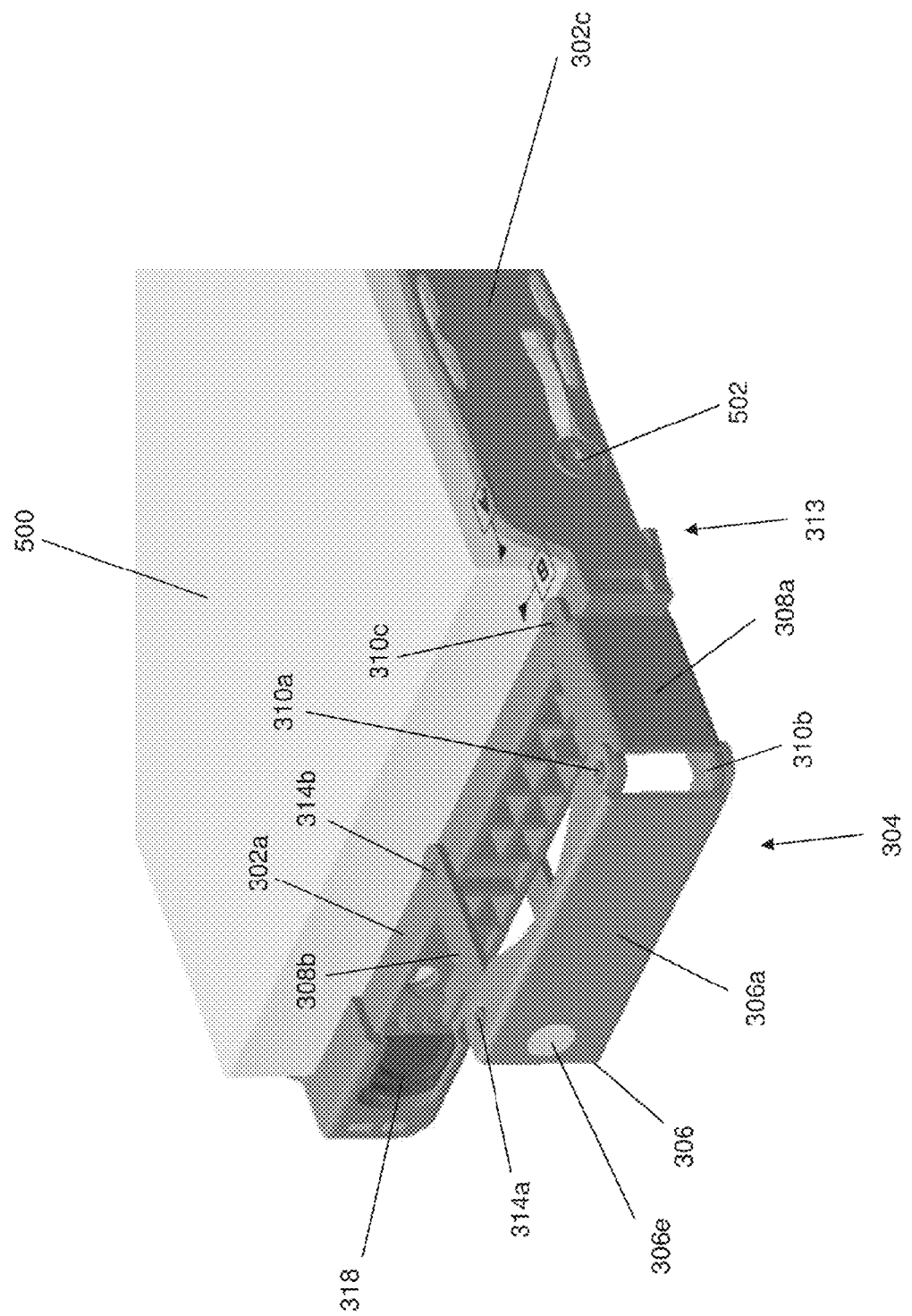
FIG. 5 is a perspective view illustrated an embodiment of a component mounted to the component carrier of FIGS. 3A, 3B, and 3C with a handle in a non-secured, handling orientation.

The method 400 begins at block 402 where a component is coupled to a component carrier that includes a carrier handling and securing feature. Referring to FIG. 5, a component 500 may be coupled to the component carrier 300 by positioning the component 500 between the carrier side walls 302a, 302b, and 302d and using couplers 502 (e.g., the screw in the illustrated embodiment) to mount the component 500 the component carrier 300. As discussed above, the component 500 is illustrated a storage drive component in the illustrated embodiment, but other types of components are envisioned as falling within the scope of the present disclosure. The method 400 then proceeds to block 404 where the carrier handling and securing feature is provided in a non-securing, handling orientation. Referring to FIGS. 3B, 3C, and 5, the carrier handling and securing feature 304 is illustrated positioned in the non-securing, handling orientation discussed above in which the link elements 308 have been rotated about their rotatable couplings 310a-d, 314a-b, and 316a-b such that they are substantially perpendicular to the carrier front wall 302a to move the handle 306 away from the carrier front wall 302a while holding the base wall 306a of the handle 306 substantially parallel to the carrier front wall 302a, with the cam element 313 not extending past the side wall 302b. As would be understood by one of skill in the art in possession of the present disclosure, with the carrier handling and securing feature 304 positioned in the non-securing, handling orientation, the handle 306 provides a convenient portion of the component carrier 300 that a user may grasp in order to carry the component 500 and component carrier 300, and the forces generated during such carrying will be distributed across the carrier front wall 302a via the rotatable couplings 310b, 310c, 314b, and 316b, rather than focusing those forces on a single hinge as in conventional component carriers.

Figure 6:
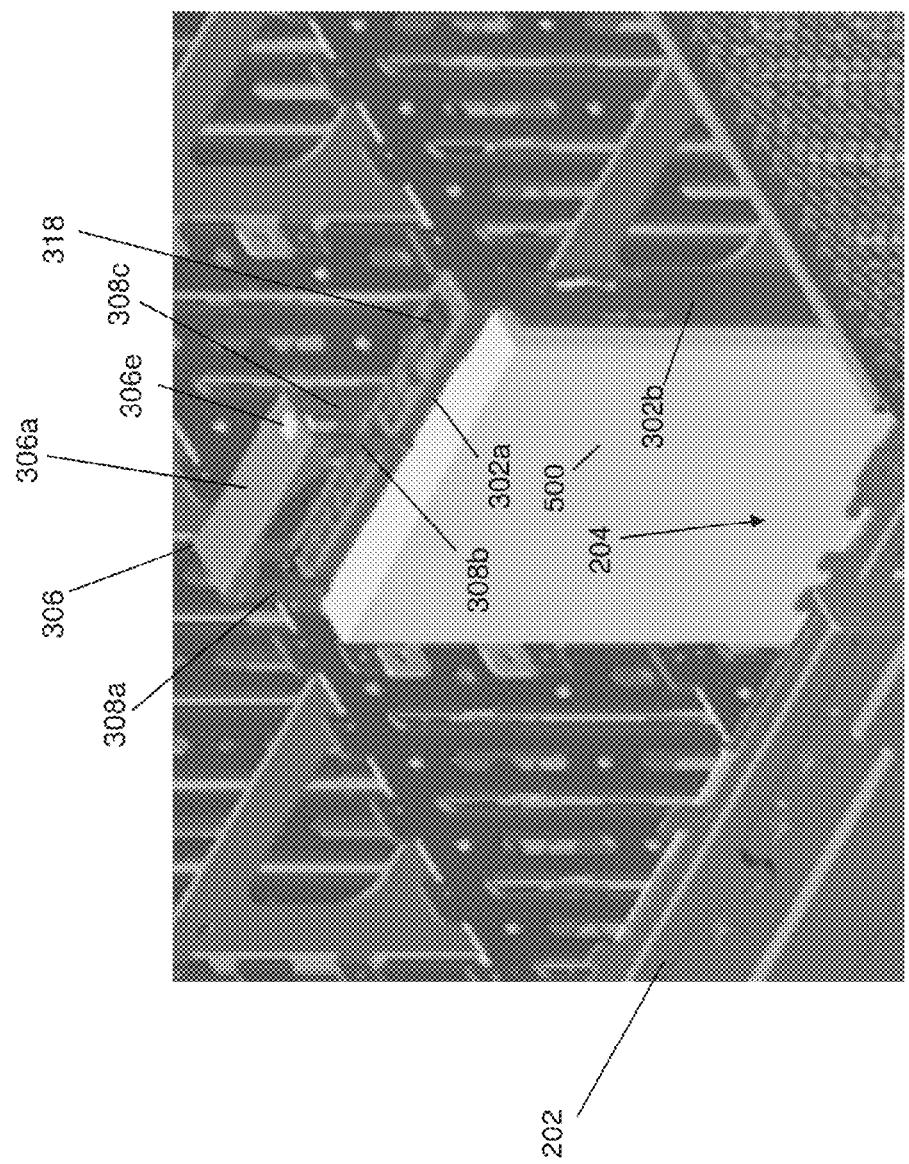
FIG. 6 is a perspective view illustrating an embodiment of the component and component carrier combination of FIG. 5 being inserted into the component slot of FIG. 2B in the component enclosure of FIG. 2A.
Figure 7:
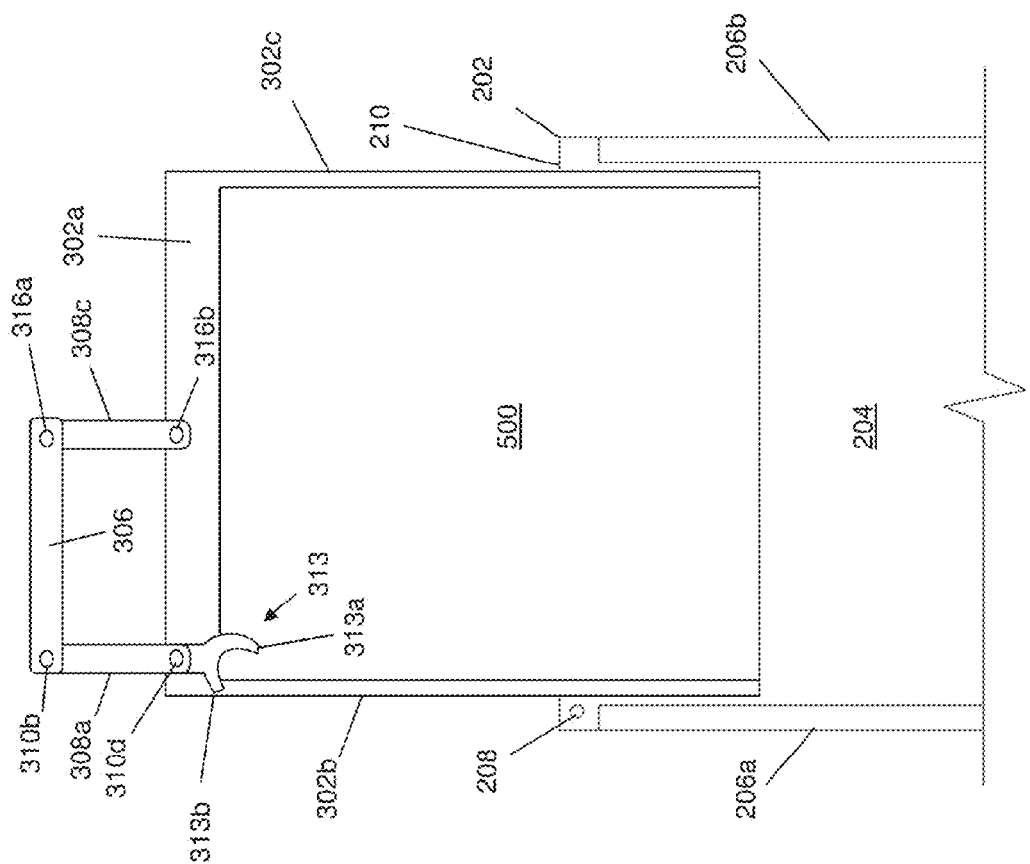
FIG. 7 is a side/cross sectional view illustrating an embodiment of the component and component carrier combination of FIG. 5 being inserted into the component slot of FIG. 2B in the component enclosure of FIG. 2A.

The method 400 then proceeds to block 406 where the component and component carrier are positioned in a component slot defined by a component enclosure. Referring now to FIGS. 6 and 7, the coupled-together component 500 and component carrier 300 may be positioned adjacent one of the component slots 204 defined by the base 202 of the component enclosure 200 such that a rear portion of the component 500 that is located opposite the carrier front wall 302a is positioned adjacent the entrance 210 to the component slot 204. As discussed above, such positioning may be accomplished by a user grasping the handle 306 while the carrier handling and securing feature 304 is positioned in the non-securing, handling orientation and moving the component 500 and the component carrier 300 adjacent the component slot 204. The component 500 and component carrier 300 may then be moved into the component slot 204, as illustrated in FIGS. 6 and 7, such that guide features on the carrier side walls 302b and 302c engage guide features on the base 202 of the chassis enclosure 200 located adjacent the component slot 204. In an embodiment, the component 500 and component carrier 300 may be moved through the component slot 204 until a component connector on the component 500 (not illustrated, but which may be located on the rear portion of the component 500 located opposite the carrier front wall 302a) engages or becomes located immediately adjacent a component connection provided in the chassis enclosure 200 (e.g., on a backplane housed in the chassis enclosure 200, which may be coupled to a variety IHS components such that the processor 102, memory devices 118, and/or other IHS components discussed above with reference to FIG. 1).

Figure 8:
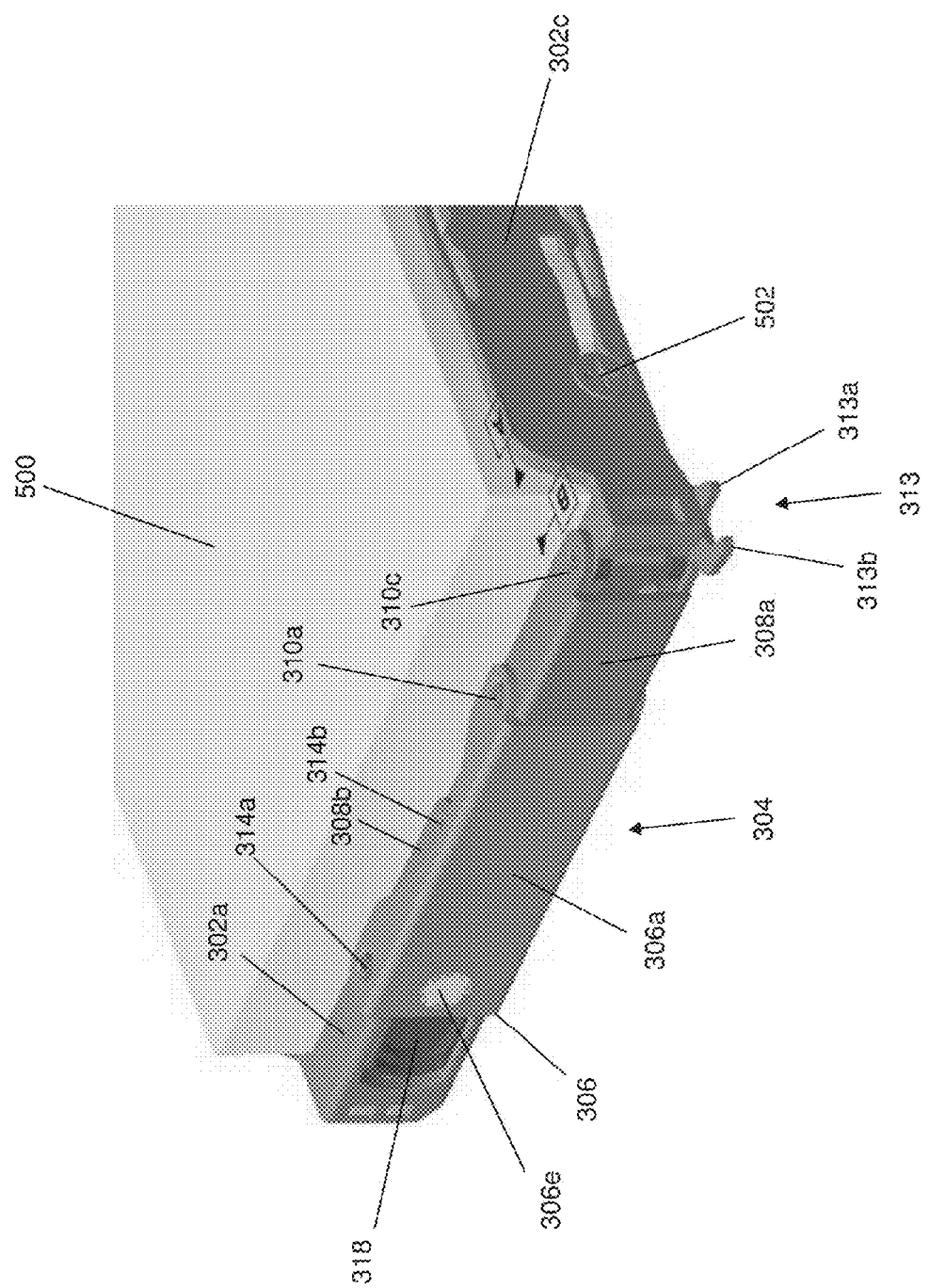
FIG. 8 is a perspective view illustrated an embodiment of a component mounted to the component carrier of FIGS. 3A, 3B, and 3C with a handle in a securing orientation.

The method 400 then proceeds to block 408 where the carrier handling and securing feature is moved into a securing orientation. Referring now to FIGS. 8 and 9, the carrier handling and securing feature 314 may be moved into the securing orientation in response to a user providing a force on the handle 306 that causes the link elements 308 to rotate about the rotatable couplings 310a-d, 314a-b, and 316a-b such that they are substantially parallel to the carrier front wall 302a to move the handle 306 towards the carrier front wall 302a while holding the base wall 306a of the handle 306 substantially parallel to the carrier front wall 302a, with a portion of the carrier wall 302a becoming located in the link element channel 312 defined by the link element 308a, and a portion of the carrier front wall 302a and at least some portions of the link elements 308a, 308b, and 308c becoming located in the handle channel 306d defined by the handle 306, as illustrated in FIG. 8. Furthermore, movement of the carrier handling and securing feature 314 into the securing orientation cause the cam element 313 to extends past the side wall 302b such that the securing portion 313a of the cam element 313 on the component carrier 300 engages the cam element 208 on the component enclosure 200 to provide a cam mechanism that, during the movement of the carrier handling and securing feature 314 from the non-securing, handling orientation to the securing orientation, produces a camming force that moves the component 500 and component carrier 300 into the component slot 204. In some embodiments, that camming force that moves the component 500 and component carrier 300 into the component slot 204 may provide for the engagement of the component connector on the component 500 and the component connection in the component enclosure 200, discussed above. With the carrier handling and securing feature 314 fulling positioned in the securing orientation, the latch securing feature 306e on the handle 306 engages the latch 318 to secure the handle 306 adjacent the carrier front wall 302a such that a user must release the latch 318 (e.g., by manipulating the latch 318 in manners known in the art) in order to move the carrier handling and securing feature 314 from the securing orientation back to the non-securing, handling orientation. With the carrier handling and securing feature 314 fulling positioned in the securing orientation, the component 500 is coupled to and secured in the component slot 204 and mated with a backplane in the component enclosure 200.

In order to remove the component 500 and component carrier 300 from the component slot 204, the user may release the latch 318 to disengage the latch securing feature 306e on the handle 306 from the latch 318 and then grasp the handle 306 and provide a force on the handle 306 that causes the link elements 308 to rotate about the rotatable couplings 310a-d, 314a-b, and 316a-b such that they are substantially perpendicular to the carrier front wall 302a to move the handle 306 away from the carrier front wall 302a while holding the base wall 306a of the handle 306 substantially parallel to the carrier front wall 302a. During this movement, the release portion 313b of the cam element 313 may engage the cam element 208 on the component enclosure 200 to provide a release mechanism that, during the movement of the carrier handling and securing feature 314 from the securing orientation to the non-securing, handling orientation, produces a release force that moves the component 500 and component carrier 300 partially out of the component slot 204. One of skill in the art in possession of the present disclosure will recognize that such movement may provide a portion of the component carrier 300 and the component 500 for a user to grasp in order to remove the component 500 and component carrier 300 from the component slot. Furthermore, due to the orientation of the handle 306 and link elements 308 in the non-securing, handling orientation, use of the handle 306 to remove the component 500 and component carrier 300 from the component slot 204 produces a force that is substantially perpendicular to the entrance 210 of the component slot 204, thus eliminating the forces introduced by conventional systems that provide a partially parallel force (e.g., relative to the entrance 210 of the component slot 204) that causes the component carrier 300 to engage the base 202 of the component enclosure 200 that defines the component slot 204 and introduces frictional forces between the component carrier 300 and the component enclosure 200 that make it difficult to remove the component 500 and component carrier 300 from the component slot 204.

Thus, systems and methods have been described that provide a component carrier having a carrier handling and securing feature that reduces stresses during the handling and securing of the component carrier to a component enclosure by distributing forces generated during the securing of the component carrier to the component carrier, while providing a handling orientation that does not focus forces on a single hinge and that does introduce frictional forces between the component carrier and the component enclosure that make it more difficult to remove the component carrier from the component enclosure. The carrier handling and securing feature of the present disclosure has been found to provide substantial benefits over the single rotatable handles/single hinge designs utilized in the conventional component carriers and dense component systems discussed above, ensuring longer lifetimes for the component carriers and a better user experience in handling and securing components to component enclosures.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A component carrier coupling system, comprising:
 a carrier base including a carrier wall;
 a handle;
 a plurality of link elements that each include a first end rotatably connected to the handle and a second end rotatably connected to the carrier wall such that the handle is coupled to the carrier wall in a substantially parallel orientation to the carrier wall, wherein the plurality of link elements are spaced apart from each other such that:
  rotation of each of the plurality of link elements in a first direction rotates the plurality of link elements into a perpendicular orientation relative to the carrier wall while moving the handle away from the carrier wall and keeping the handle in the substantially parallel orientation to the carrier wall, and
  rotation of each of the plurality of link elements in a second direction that is opposite the first direction rotates the plurality of link elements into a substantially parallel orientation relative to the carrier wall while moving the handle immediately adjacent the carrier wall; and
 a cam element on at least one of the plurality of link elements that is configured to engage a component enclosure when the carrier base is located in the component enclosure and the plurality of link elements are rotated in the second direction.

2. The system of claim 1, wherein the plurality of link elements includes four link elements, and wherein a first pair of the four link elements are located on a first side of the carrier wall and a second pair of the four link elements are located on a second side of the carrier wall that is opposite the first side.

3. The system of claim 1, further comprising:
 a latch that is located on the carrier wall and that is configured to engage the handle when the handle is moved immediately adjacent the carrier wall to secure the handle to the carrier wall.

4. The system of claim 1, wherein at least one first link element of the plurality of link elements is rotatably coupled to the carrier wall approximately midway between a first edge and a second edge of the carrier wall, and wherein at least one second link element of the plurality of link elements is rotatably coupled to the carrier wall adjacent the first edge.

5. The system of claim 1, wherein the carrier wall is provided by a carrier front wall on the carrier base, and wherein a first carrier side wall extends substantially perpendicularly from a first edge of the carrier front wall and a second carrier side wall that extends substantially perpendicularly from a second edge of the carrier front wall that is opposite the carrier front wall from the first edge, and wherein the first carrier side wall and the second carrier side wall are in a substantially parallel orientation and configured to mount a component to the carrier base and guide the carrier base through a component enclosure when the carrier base is located in the component enclosure.

6. The system of claim 1, wherein at least one link element defines a link element channel along its length, and wherein at least a portion of the carrier wall is positioned in the link element channel when the at least one link element is rotated in the second direction to move the handle immediately adjacent the carrier wall.

7. An Information Handling System (IHS), comprising:
 a drive enclosure defining a drive slot;
 a drive; and
 a drive carrier mounted to the drive and positioned in the drive slot, wherein the drive carrier includes:
  a drive carrier wall;
  a handle;
  a plurality of link elements that each include a first end rotatably connected to the handle and a second end rotatably connected to the drive carrier wall such the handle is coupled to the drive carrier wall in a substantially parallel orientation to the drive carrier wall, wherein the plurality of link elements are spaced apart from each other such that:
   rotation of each of the plurality of link elements in a first direction rotates the plurality of link elements into a perpendicular orientation relative to the drive carrier wall while moving the handle away from the drive carrier wall and keeping the handle in the substantially parallel orientation to the drive carrier wall, and
   rotation of each of the plurality of link elements in a second direction that is opposite the first direction rotates the plurality of link elements into a substantially parallel orientation relative to the drive carrier wall while moving the handle immediately adjacent the drive carrier wall; and
  a cam element on at least one of the plurality of link elements that is configured to engage the drive enclosure when the plurality of link elements are rotated in the second direction.

8. The IHS of claim 7, wherein the plurality of link elements includes four link elements, and wherein a first pair of the four link elements are located on a first side of the drive carrier wall and a second pair of the four link elements are located on a second side of the drive carrier wall that is opposite the first side.

9. The IHS of claim 7, further comprising:
 a latch that is located on the drive carrier wall and that is configured to engage the handle when the handle is moved immediately adjacent the drive carrier wall to secure the handle to the drive carrier wall.

10. The IHS of claim 7, wherein at least one first link element of the plurality of link elements is rotatably coupled to the drive carrier wall approximately midway between a first edge and a second edge of the drive carrier wall, and wherein at least one second link element of the plurality of link elements is rotatably coupled to the drive carrier wall adjacent the first edge.

11. The IHS of claim 7, wherein the handle defines a handle channel along its length, and wherein at least a portion of the plurality of link elements and at least a portion of the drive carrier wall are positioned in the handle channel when the handle is moved immediately adjacent the drive carrier wall.

12. The IHS of claim 7, wherein at least one link element defines a link element channel along its length, and wherein at least a portion of the drive carrier wall is positioned in the link element channel when the at least one link element is rotated in the second direction to move the handle immediately adjacent the drive carrier wall.

13. A method for coupling a component, comprising:
coupling a component to a component carrier that includes a carrier wall, wherein a handle is coupled to the carrier wall in a substantially parallel orientation to the carrier wall by a plurality of link elements that each include a first end rotatably connected to the handle and a second end rotatably connected to the carrier wall;
rotating each of the plurality of link elements in a first direction and into a perpendicular orientation relative to the carrier wall in order to move the handle away from the carrier wall while the handle remains in the substantially parallel orientation to the carrier wall;
positioning the component carrier in a component slot defined by a component enclosure when the handle is moved away from the carrier wall; and
rotating each of the plurality of link elements in a second direction that is opposite the first direction and into a substantially parallel orientation relative to the carrier wall in order to move the handle immediately adjacent the carrier wall and cause a cam element that is located on at least one of the plurality of link elements to engage the component enclosure.

14. The method of claim 13, wherein the plurality of link elements includes four link elements, and wherein a first pair of the four link elements are located on a first side of the carrier wall and a second pair of the four link elements are located on a second side of the carrier wall that is opposite the first side.

15. The method of claim 13, further comprising:
engaging the handle with a latch that is located on the carrier wall when the handle is moved immediately adjacent the carrier wall to secure the handle to the carrier wall.

16. The method of claim 13, wherein at least one first link element of the plurality of link elements is rotatably coupled to the carrier wall approximately midway between a first edge and a second edge of the carrier wall, and wherein at least one second link element of the plurality of link elements is rotatably coupled to the carrier wall adjacent the first edge.

17. The method of claim 13, further comprising:
positioning at least a portion of the plurality of link elements and at least a portion of the carrier wall in a handle channel that is defined by the handle when the handle is moved immediately adjacent the carrier wall.

* * * * *